United States Patent [19]

Hayashi

[11] Patent Number: 5,450,389
[45] Date of Patent: Sep. 12, 1995

[54] DIGITAL SIGNAL REPRODUCING APPARATUS FOR REDUCING THE ADVERSE INFLUENCE OF ASYMMETRY

[75] Inventor: Hideki Hayashi, Tsurugashima, Japan

[73] Assignee: Pioneer Electronic Corporation, Tokyo, Japan

[21] Appl. No.: 67,123

[22] Filed: May 26, 1993

[30] Foreign Application Priority Data

Jun. 3, 1992 [JP] Japan .................................. 4-143042

[51] Int. Cl.6 ............................................... G11B 5/09
[52] U.S. Cl. ........................................... 369/59; 360/53
[58] Field of Search ................ 360/48, 51, 40, 32, 360/53; 369/59, 53, 54; 375/76, 22

[56] References Cited

U.S. PATENT DOCUMENTS

| | | | |
|---|---|---|---|
| 3,691,543 | 9/1972 | Mueller | 340/174.1 B |
| 4,387,364 | 6/1983 | Shirota | 369/59 X |
| 4,789,838 | 12/1988 | Cheng | 328/150 |
| 5,058,093 | 10/1991 | Mukai | 369/59 X |
| 5,134,632 | 7/1992 | Fletcher et al. | 375/22 |
| 5,166,955 | 11/1992 | Ohta | 360/65 X |
| 5,220,466 | 6/1993 | Coker et al. | 360/46 |
| 5,229,986 | 7/1993 | Mizokami et al. | 360/51 X |
| 5,255,128 | 10/1993 | Inoue et al. | 360/51 X |

*Primary Examiner*—Donald Hajec
*Assistant Examiner*—Thien Minh Le
*Attorney, Agent, or Firm*—Sughrue, Mion, Zinn, Macpeak & Seas

[57] ABSTRACT

Disclosed is a digital signal reproducing apparatus, which outputs the read signal after changing its signal level by using the non-linear circuit whose amplifying characteristic changes in accordance with the difference between the center level of the amplitude of that signal pattern in the read signal which varies in a relatively short period and the center level of the amplitude of that signal pattern in the read signal which varies in a relatively long period. Accordingly, the adverse influence of asymmetry can be reduced in the form of a read signal quantized with multiple values, so that a Viterbi decoder or the like which decodes such a multivalue-quantized signal can be connected directly to the apparatus.

3 Claims, 8 Drawing Sheets

PRIOR ART

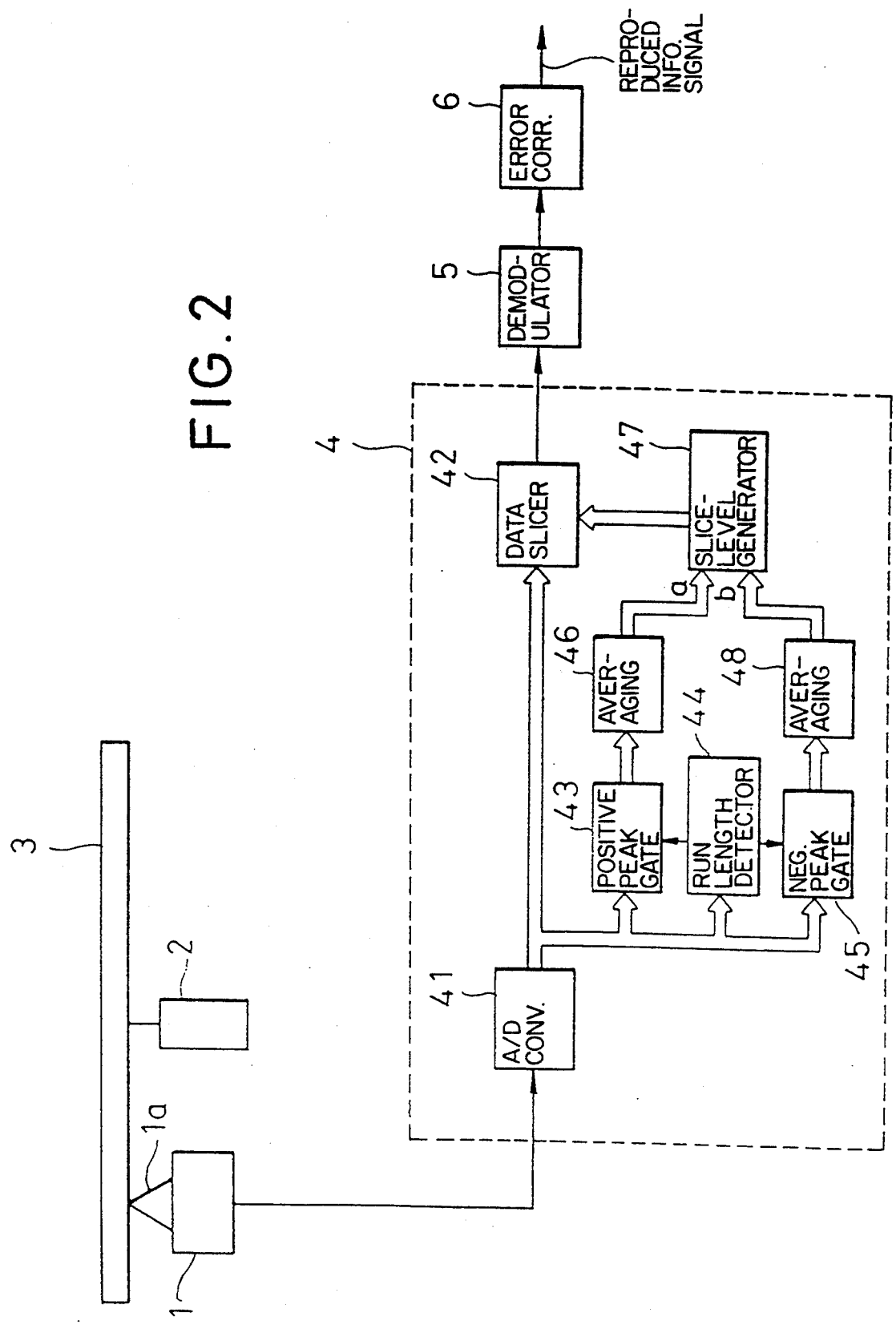

PRIOR ART
FIG. 3A   0  0  1  1  0  0  1
FIG. 3B
FIG. 3C
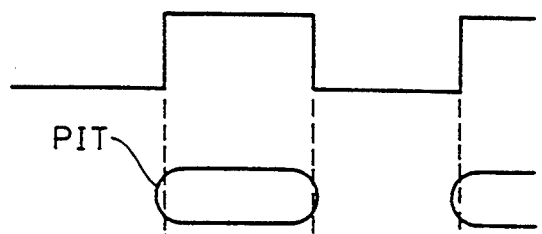
FIG. 3D
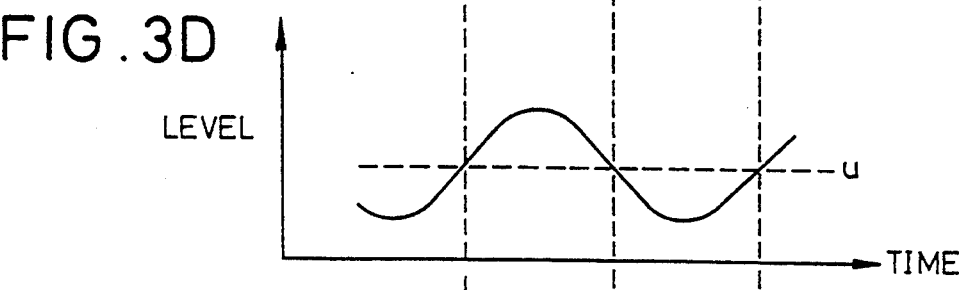
FIG. 3E
FIG. 3F
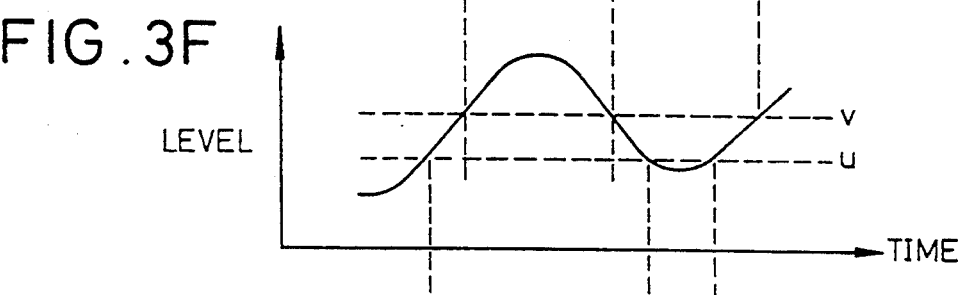
FIG. 3G

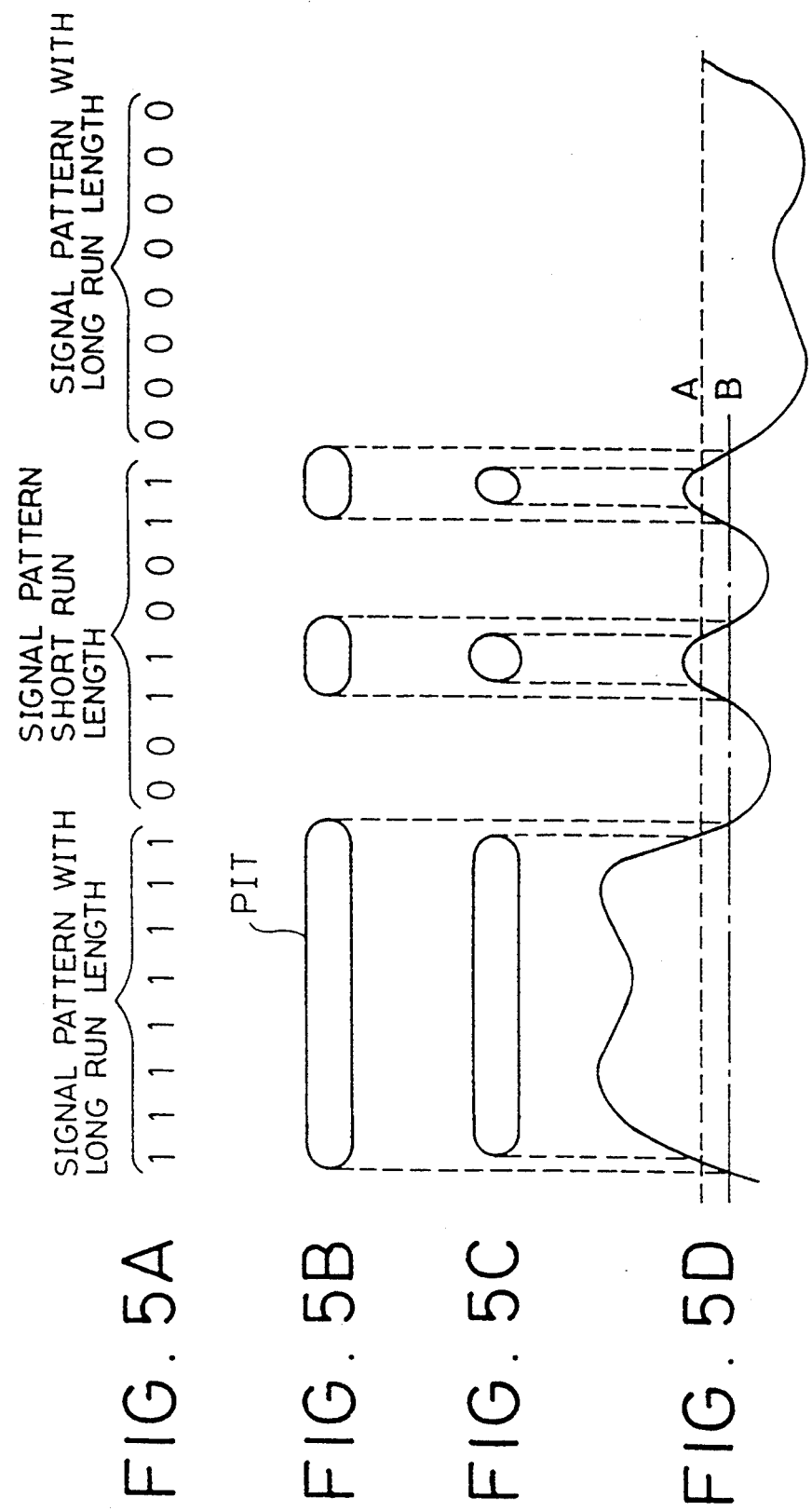

A ≫ B

A > B

A ≃ B

A < B

A ≪ B

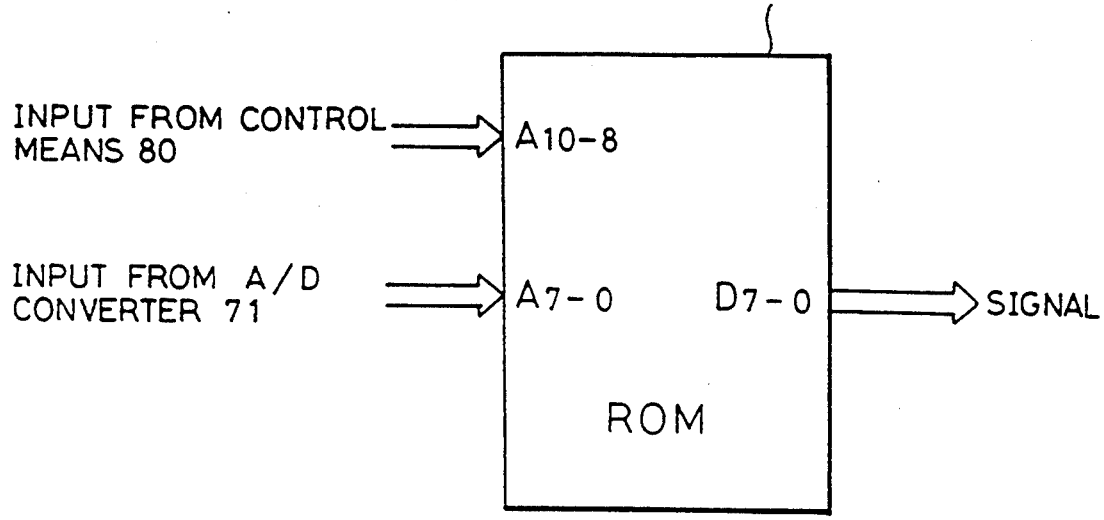

DIGITAL SIGNAL REPRODUCING APPARATUS FOR REDUCING THE ADVERSE INFLUENCE OF ASYMMETRY

BACKGROUND OF THE INVENTION

Field of the Invention

The present invention relates to an apparatus for reproducing digital signals recorded on a recording medium, such as an optical disk.

Description of the Related Art

In an apparatus for reproducing digital signals recorded on a recording medium, the level of a read signal output from the pickup is compared with a predetermined slice level (voltage comparison), and a signal corresponding to "1" and "0" in digital data is output with this slice level taken as a threshold value. At this time, various read-signal varying factors, such as a variation in reflectance of the disk, a servo error, a variation in low-frequency component included in the data, a variation in the amplitude of the read signal and asymmetry, are present in the optical disk system. For instance, with regard to the influence of asymmetry, if the ideal row of pits in recording a certain information signal is the one having the pit length as shown in FIG. 1A, pits to be actually recorded may have a shorter pit length as shown in FIG. 1B than the one shown in FIG. 1A, or may have a longer pit length as shown in FIG. 1C.

The read signal actually output from the pickup would therefore be different from the one actually recorded, so that a read error would occur when a digital signal is output through comparison of the level of the read signal with the predetermined slice level. To cope with this problem, conventional digital signal reproducing apparatuses employ ATC (Automatic Threshold Control) to control the slice level to always be the optimal value.

FIG. 2 illustrates the structure of a disk player including this conventional digital signal reproducing apparatus.

The player in FIG. 2 plays a disk on which digital signals coded through modulation are recorded as rows of pits.

An optical pickup 1 irradiates a light beam 1a to an optical disk 3, which is rotated by a spindle motor 2, and sends the reflection light to a digital signal reproducing apparatus 4 after photoelectric conversion. The digital signal reproducing apparatus 4 sends a signal corresponding to digital data "1" and "0" to a demodulator 5 in accordance with the level of the received signal. The demodulator 5 demodulates the input signal from the digital signal reproducing apparatus 4, which has been modulated to be coded at the recording time, and sends the demodulated signal to an error correction circuit 6. The error correction circuit 6 performs error correction on the received signal and outputs the resultant signal as a reproduced information signal.

The digital signal reproducing apparatus 4 will be described below.

An A/D converter 41 converts an input analog signal into a digital signal and supplies the digital signal to a data slicer 42, a positive peak gate 43, a run-length detector 44 and a negative peak gate 45. The run-length detector 44 detects when a change occurs in the value of the received digital signal from a rising state, to a peak, then to a falling state occurs in a relatively short period of time, and sends a gate signal to the positive peak gate 43 while this rise-peak-fall change continues. The run-length detector 44 also detects when a change occurs in the value of the received digital signal from a falling state, to a peak, then to a rising state occurs in a relatively short period of time, and sends the gate signal to the negative peak gate 45 while this fall-peak-rise change continues. The positive peak gate 43 supplies the digital signal from the A/D converter 41 to averaging means 46 only while receiving the gate signal from the run-length detector 44. The averaging means 46 sends an average value of the digital signal from the positive peak gate 43 to an input terminal a of slice-level generating means 47. The negative peak gate 45 supplies the digital signal from the A/D converter 41 to averaging means 48 only while receiving the gate signal from the run-length detector 44. The averaging means 48 sends an average value of the digital signal from the negative peak gate 45 to an input terminal b of the slice-level generating means 47. The slice-level generating means 47 adds the levels of the signals received at the input terminal a and the input terminal b, and sends the resultant value divided by two to the data slicer 42. The data slicer 42 sends a signal having a level corresponding to digital data "1" to the demodulator 5 when the value of the digital signal from the A/D converter 41 is equal to or greater than that of the digital signal from the slice-level generating means 47. When the value of the former digital signal is smaller than that of the latter digital signal, the data slicer 42 sends a signal having a level corresponding to digital data "0" to the demodulator 5.

The above-described conventional digital signal reproducing apparatus is designed based on the fact that the center level of the amplitude in that pattern in a read signal output from the pickup which has a short run length varies in accordance with the degree of the influence of asymmetry.

For instance, in recording a row of data pieces as shown in FIG. 3A on a recording disk, the recorded waveform becomes the one as shown in FIG. 3B. Without asymmetry, the shape of pits formed on the disk reflects the recorded waveform with fidelity as shown in FIG. 3C. When this data is reproduced by the pickup, the read signal has a waveform with a level u as the center of amplitude as shown in FIG. 3D. By slicing the waveform of the read signal at the center level u, the recorded waveform of FIG. 3B can be reproduced accurately. If there is asymmetry, on the other hand, the formed pits may be longer with short gaps therebetween as shown in FIG. 3E. Accordingly, the read signal output from the pickup would have a waveform with a level v as the center of amplitude as shown in FIG. 3F. The center level v of the waveform of the read signal in the case of asymmetry is higher than the center level u in FIG. 3D. Therefore, the waveform obtained by slicing the signal waveform in FIG. 3F at the level u becomes the one as shown in FIG. 3G, apparently different from the one shown in FIG. 3B. If the signal waveform is sliced at the center level v of the read signal waveform, the recorded waveform of FIG. 3B is accurately reproduced.

In the conventional digital signal reproducing apparatus, therefore, the center level of the amplitude of a pattern having a short run length is obtained and the read signal is sliced at the acquired center level as a threshold value to acquire a signal corresponding to digital data "1" and "0".

This apparatus can thus accurately reproduce a digital signal from the read signal while reducing the adverse influence of asymmetry on recorded pits.

To improve the reading performance of the digital signal reproducing apparatus, Viterbi decoding may be performed on the read signal. Viterbi decoding is a decoding scheme, which considers an input signal as a sequence of samples having some correlation with one another, selects the sequence which has the maximum likelihood among possible sample sequences, and sends out the selected one. Thus, the signal to be input to a Viterbi decoder should be quantized with multiple values.

As the above-described conventional digital signal reproducing apparatus is designed to remove the influence of asymmetry by changing the data slice level before reading a digital signal from the read signal, however, the output signal is a digitized signal having two values of "0" and "1". Thus, the conventional digital signal reproducing apparatus involves a problem that it disables the direction connection of the Viterbi decoder.

SUMMARY OF THE INVENTION

It is therefore an object of the present invention to provide a digital signal reproducing apparatus which can reduce the adverse influence of asymmetry on recorded pits and can permit direct connection of a decoder such as a Viterbi decoder that reproduces a digital signal from a signal quantized with multiple values.

To achieve the foregoing object, according to the present invention, there is provided a digital signal reproducing apparatus for reproducing a digital signal from a read signal read out from a recording medium having the digital signal recorded thereon, which apparatus comprises first center-level generating means for generating a center level of the amplitude of that signal pattern in the read signal which varies in a relatively short period, as a first center level; second center-level generating means for generating a center level of the amplitude of that signal pattern in the read signal which varies in a relatively long period, as a second center level; and a non-linear circuit for changing the level of the read signal with an amplifying characteristic corresponding to a level difference between the first and second center levels before outputting the read signal.

The digital signal reproducing apparatus according to the present invention outputs the read signal after changing its signal level by using the non-linear circuit whose amplifying characteristic changes in accordance with the difference between the center level of the amplitude of that signal pattern in the read signal which varies in a relatively short period and the center level of the amplitude of that signal pattern in the read signal which varies in a relatively long period.

BRIEF DESCRIPTION OF THE DRAWINGS

FIG. 2 is a diagram illustrating the constitution of a display player;

FIGS. 3A through 3G are diagrams showing an asymmetry-oriented change in the waveform of a read signal;

FIGS. 5A through 5D are diagrams illustrating the detection of asymmetry in the digital signal reproducing apparatus of the present invention;

FIGS. 7A and 7B are diagrams illustrating an example of a ROM-based non-linear circuit 72.

DETAILED DESCRIPTION OF THE PREFERRED EMBODIMENTS

Preferred embodiments of the present invention will now be described referring to the accompanying drawings.

Figure 1A:
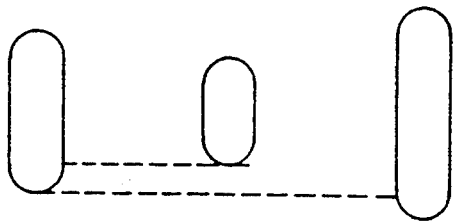
FIGS. 1A through 1C are diagrams showing a change in pit length caused by asymmetry.
Figure 1B:
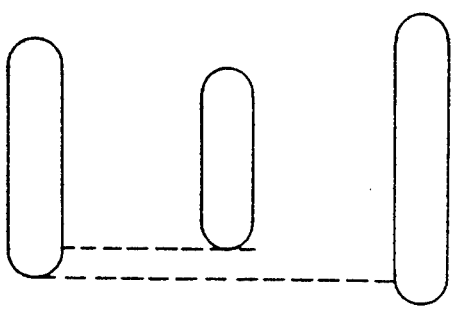
Figure 1C:
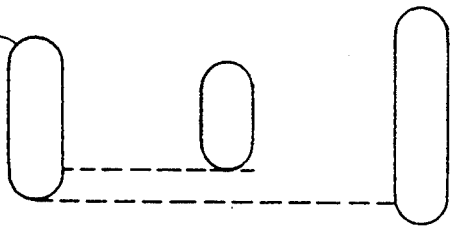
Figure 4:
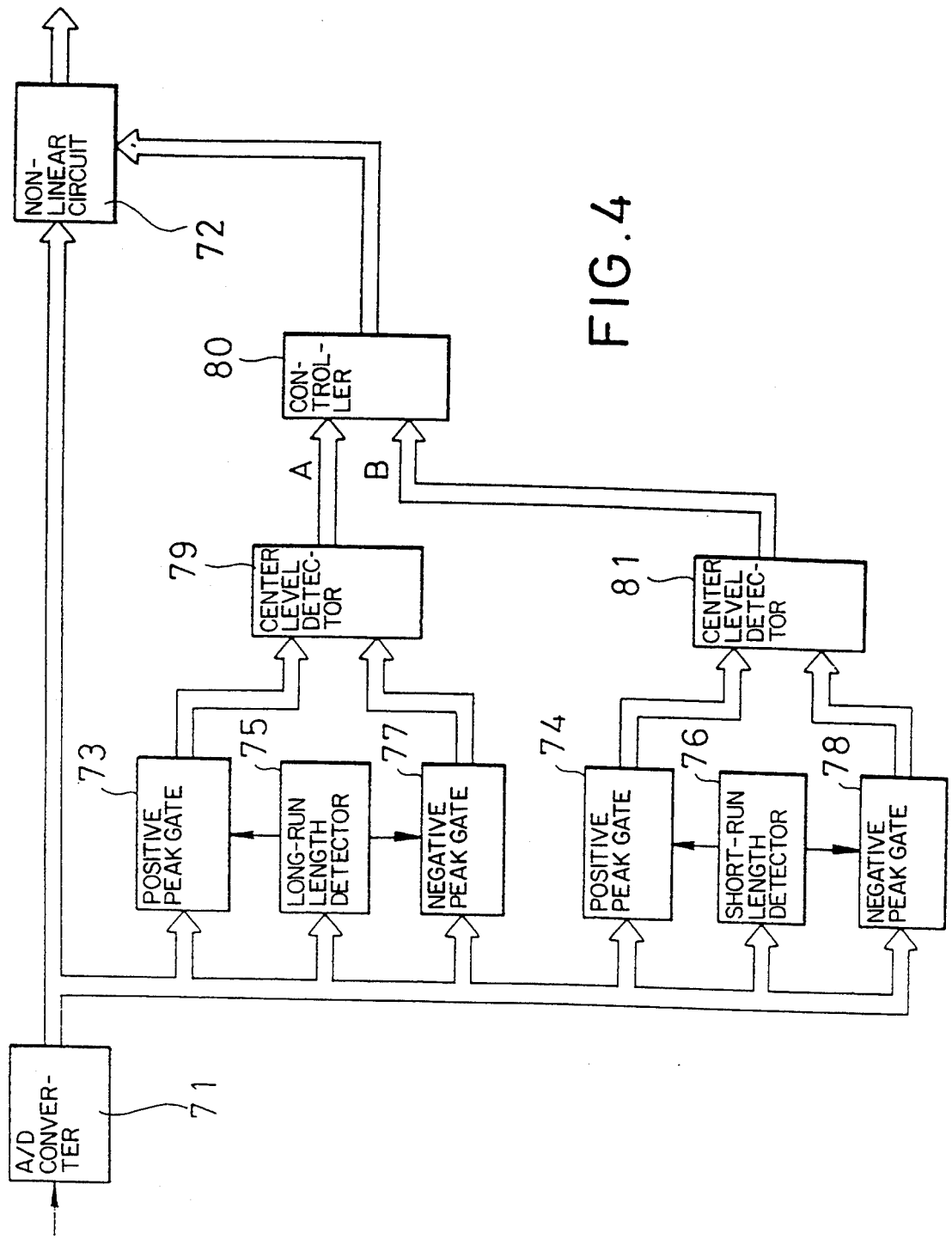
FIG. 4 is a diagram illustrating the constitution of a digital signal reproducing apparatus according to one embodiment of the present invention.

FIG. 4 illustrates the constitution of a digital signal reproducing apparatus according to the present invention.

An A/D converter 71 converts an analog read signal supplied from a pickup 1 into a digital signal and supplies the digital signal to a non-linear circuit 72, positive peak gates 73 and 74, a long-run-length detector 75, a short-run-length detector 76, negative peak gates 77 and 78. The long-run-length detector 75 detects a signal pattern in the received digital signal which varies in a relatively long period of time, and sends a gate signal to the positive peak gate 73 while the signal level of this signal pattern is at a positive peak level. The long-run-length detector 75 also sends the gate signal to the negative peak gate 77 while the signal level of that signal pattern is at a negative peak level. The positive peak gate 73 supplies the digital signal from the A/D converter 71 to center-level detecting means 79 only while receiving the gate signal from the long-run-length detector 75. The negative peak gate 77 supplies the digital signal from the A/D converter 71 to the center-level detecting means 79 only while receiving the gate signal from the long-run-length detector 75. The center-level detecting means 79 adds the signal from the positive peak gate 73 and the signal from the negative peak gate 77, and sends the resultant value divided by two to control means 80. The short-run-length detector 76 detects a signal pattern in the received digital signal which varies in a relatively short period of time, and sends a gate signal to the positive peak gate 74 while the signal level of this signal pattern is at a positive peak level. This detector 76 also sends the gate signal to the negative peak gate 78 while the signal level of that signal pattern is at a negative peak level. The positive peak gate 74 supplies the digital signal from the A/D converter 71 to center-level detecting means 81 only while receiving the gate signal from the short-run-length detector 76. The negative peak gate 78 supplies the digital signal from the A/D converter 71 to the center-level detecting means 81 only while receiving the gate signal from the short-run-length detector 76. The center-level detecting means 81 adds the signal from the positive peak gate 74 and the signal from the negative peak gate 78, and sends the resultant value divided by two to the control means 80. The control means obtains the level difference between the signal from the center-level detecting means 79 and the signal from the center-level detecting means 81, and sends a control signal according to that level difference to the non-linear circuit 72. The non-linear circuit 72 changes the value of the digital signal supplied from the A/D converter 71 with an amplifying characteristic corresponding to the control signal from the control means 80, and sends the resultant signal to a Viterbi decoder (not shown). The Viterbi decoder performs Viterbi decoding on the received signal and sends a signal corresponding to digital data "1" and "0" to a demodulator 5.

The operation of the circuit with the above-described constitution will now be described.

Figure 6A:
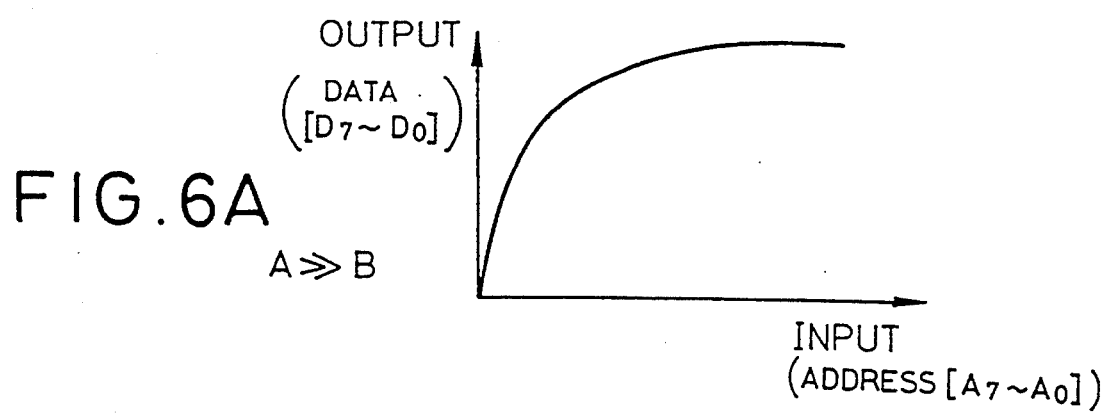
FIGS. 6A through 6E are diagrams showing the amplifying characteristic of a non-linear circuit 72.
Figure 6B:
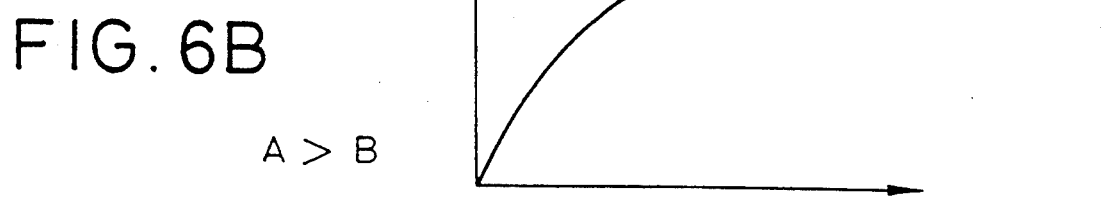
Figure 6C:
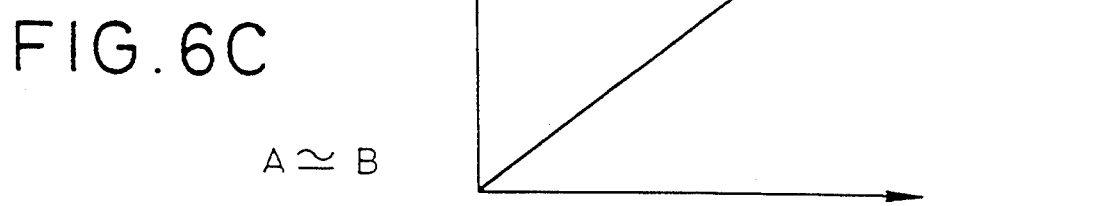
Figure 6D:
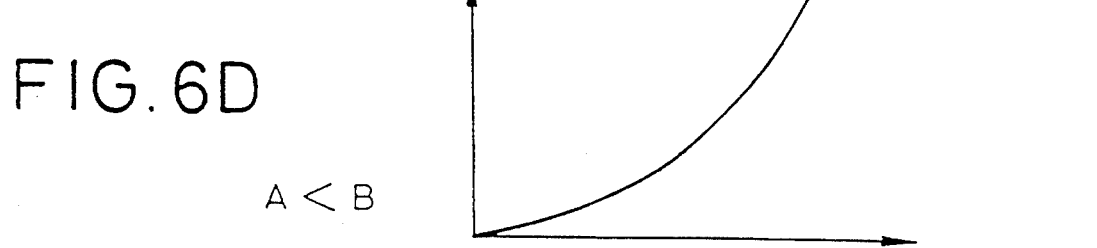
Figure 6E:
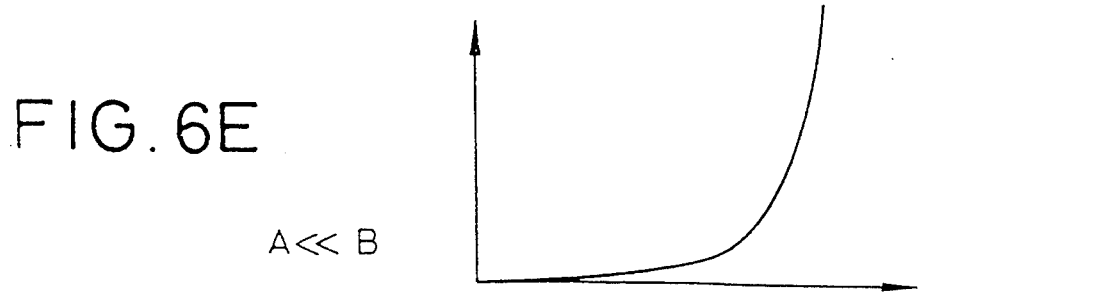

For instance, when a digital signal as shown in FIG. 5A is recorded in the form of a row of pits on an optical disk 3, the ideal pit shape in this case would become the one as shown in FIG. 5B. Assume that the actual shape of the pits is such that the formed pits are short with long gaps therebetween as shown in FIG. 5C due to asymmetry. Then, the read signal output from the pickup 1 has a waveform as indicated by a solid line in FIG. 5D. This read signal is supplied to the A/D converter 71 to be converted into a digital signal. The circuit which comprises the long-run-length detector 75, positive peak gate 73, negative peak gate 77 and center-level detecting means 79 detects the center level of the amplitude of that signal pattern in the digital signal from the A/D converter 71 which varies in a relatively long period or which has a long run length, as indicated by a broken line A in FIG. 5D. Likewise, the circuit which comprises the short-run-length detector 76, positive peak gate 74, negative peak gate 78 and center-level detecting means 81 detects the center level of the amplitude of that signal pattern in the digital signal from the A/D converter 71 which varies in a relatively short period or which has a short run length, as indicated by an alternate long and short dash line B in FIG. 5D. The control means 80 controls the amplifying characteristic of the non-linear circuit 72 in accordance with the level difference between the level of the broken line A and the level of the alternate long and short dash line B both in FIG. 5D. When the level A is considerably higher than the level B, the non-linear circuit 72 has an amplifying characteristic as shown in FIG. 6A. When the level A is relatively higher than the level B, the non-linear circuit 72 has an amplifying characteristic as shown in FIG. 6B. When the level A is nearly equal to the level B, the non-linear circuit 72 has an amplifying characteristic as shown in FIG. 6C. When the level B is relatively higher than the level A, the non-linear circuit 72 has an amplifying characteristic as shown in FIG. 6D. When the level B is considerably higher than the level A, the non-linear circuit 72 has an amplifying characteristic as shown in FIG. 6E.

While the non-linear circuit 72 changes its amplifying characteristic in accordance with the control signal, it may be realized by a ROM (Read Only Memory) as shown in FIGS. 7A and 7B.

FIG. 7A shows an example of the connection of such a ROM-based non-linear circuit 72 to the associated components. In the diagram, the A/D converter 71 is treated as an 8-bit A/D converter.

A 3-bit control signal from the control means 80 is input to terminals A10 to A8 for the upper address bits, while an 8-bit signal from the A/D converter 71 is input to address terminals A7 to A0. The outputs from data terminals D7 to D0 directly become the output of the non-linear circuit 72.

FIG. 7B exemplifies the map of the ROM.

With the ROM address A10–A8 being "000", in the process where the address A7–A0 increases to "11111111" from "00000000", data that increases along the curve shown in FIG. 6A is stored at D7–D0. With the ROM address A10–A8 being "001", in the process where the address A7–A0 increases to "11111111" from "00000000", data that increases along the curve shown in FIG. 6B is stored at D7–D0. With the ROM address A10–A8 being "010", in the process where the address A7–A0 increases to "11111111" from "00000000", data that increases along the line shown in FIG. 6C is stored at D7–D0. With the ROM address A10–A8 being "011", in the process where the address A7–A0 increases to "11111111" from "00000000", data that increases along the curve shown in FIG. 6D is stored at D7–D0. With the ROM address A10–A8 being "100", in the process where the address A7–A0 increases to "11111111" from "00000000", data that increases along the curve shown in 6E is stored at D7–D0.

With the non-linear circuit 72 having the ROM-based constitution as shown in FIGS. 7A and 7B, therefore, the control means 80 supplies a control signal of "000" to the ROM address terminals A10–A8 when the level A (broken line) in FIG. 5D is considerably higher than the level B (alternate long and short dash line), supplies a control signal of "001" to those terminals A10–A8 when the level A is relatively higher than the level B, supplies a control signal of "010" to those terminals A10–A8 when the level A is nearly equal to the level B, supplies a control signal of "011" to the ROM address terminals A10–A8 when the level B is relatively higher than the level A, and supplies a control signal of "100" to those terminals A10–A8 when the level B is considerably higher than the level A.

With the above constitution, when the level A becomes higher than the level B, i.e., when the pit length becomes shorter than the ideal length due to asymmetry and the value of the actual read signal thus becomes smaller than that of the ideal read signal, the amplifying characteristic of the non-linear circuit 72 is set as shown in FIGS. 6A or 6B to adjust the value of the read signal before it is output. When the level A is nearly equal to the level B, i.e., when there is no influence of asymmetry, the amplifying characteristic of the non-linear circuit 72 is set as shown in FIG. 6C and the value of the read signal is output as it is. When the level B becomes higher than the level A, i.e., when the pit length becomes longer than the ideal length due to asymmetry and the value of the actual read signal thus becomes larger than that of the ideal read signal, the amplifying characteristic of the non-linear circuit 72 is set as shown in FIGS. 6D or 6E to adjust the value of the read signal before it is output.

Figure 8:
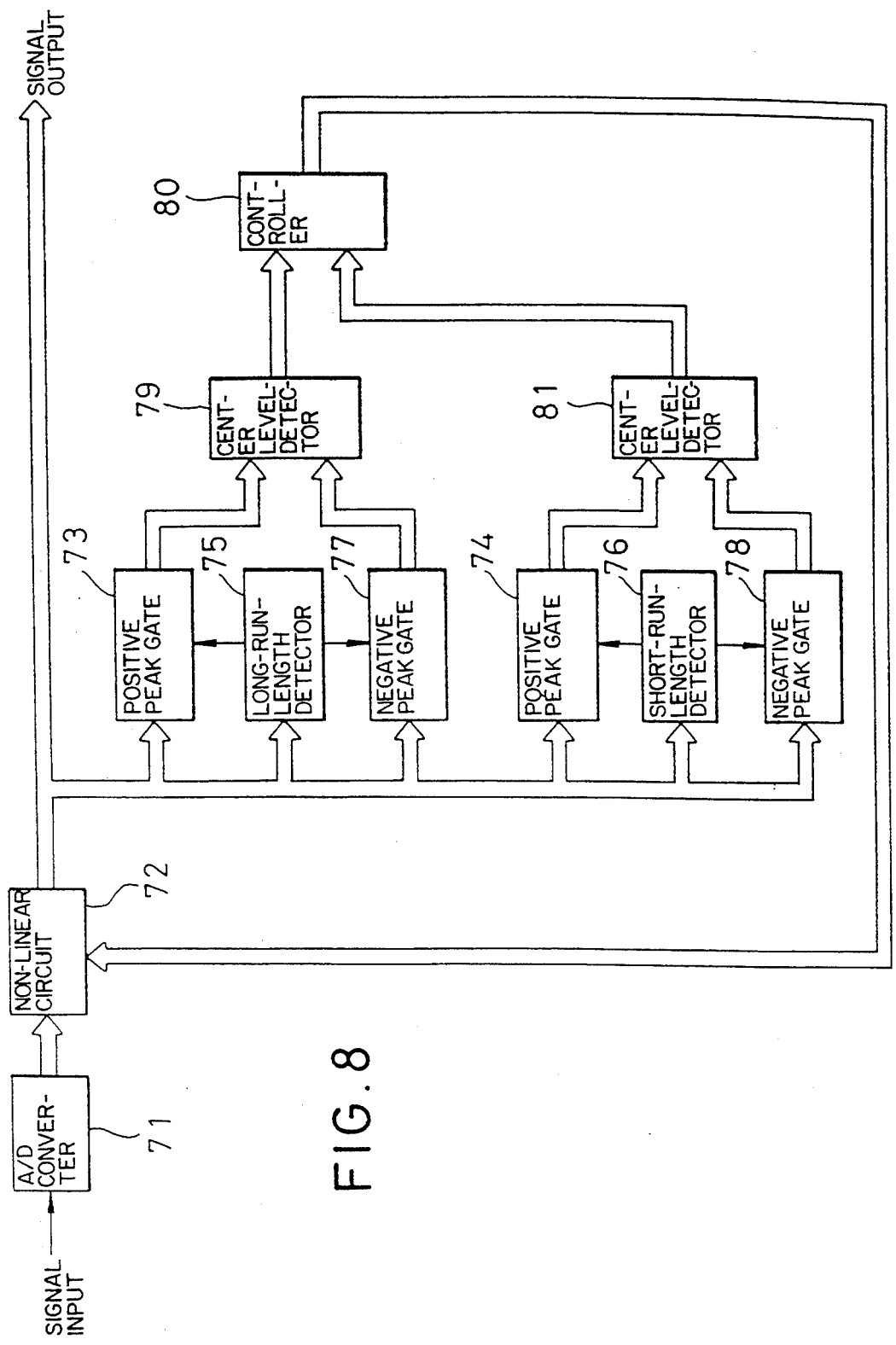
FIG. 8 is a diagram illustrating the constitution of a digital signal reproducing apparatus according to another embodiment of the present invention

Although this embodiment has a feed-forward arrangement as shown in FIG. 4, a feedback control arrangement as shown in FIG. 8 may be employed as well.

As described above, the digital signal reproducing apparatus of the present invention detects the degree of influence of asymmetry from the difference between the center level of the amplitude of that signal pattern in the read signal output from the pickup which has a short run length and the center level of the amplitude of that signal pattern in the read signal which has a long run length, and adjusts the level of the read signal in accordance with this degree before outputting it. According to the present invention, therefore, the adverse influence of asymmetry can be reduced in the form of a read signal quantized with multiple values, thus permitting direct connection of a Viterbi decoder or the like which decodes such a multivalue-quantized signal.

What is claimed is:

1. A digital signal reproducing apparatus for reproducing a digital signal from a read signal read out from a recording medium having said digital signal recorded thereon, said apparatus comprising:

first center-level generating means for generating a center level of an amplitude of that signal pattern in said read signal which varies in a relatively short period, as a first center level;

second center-level generating means for generating a center level of an amplitude of that signal pattern in said read signal which varies in a relatively long period, as a second center level; and a non-linear circuit for changing the level of said read signal with an amplifying characteristic corresponding to a level difference between said first and second center levels before outputting said read signal.

2. The digital signal reproducing apparatus according to claim 1, wherein said non-linear circuit comprises a memory in which data according to said amplifying characteristic is stored previously.

3. The digital signal reproducing apparatus according to claim 1, wherein said amplifying characteristic is approximated to a linear characteristic as said level difference approaches zero.

* * * * *